United States Patent [19]

Enk

[11] 4,351,394

[45] Sep. 28, 1982

[54] METHOD AND SYSTEM FOR AIRCRAFT FIRE PROTECTION

[76] Inventor: William A. Enk, 1213 Horizon Dr., Blue Springs, Mo. 64015

[21] Appl. No.: 107,920

[22] Filed: Dec. 28, 1979

[51] Int. Cl.[3] .......... A62C 3/08; A62C 37/18; B64D 45/00

[52] U.S. Cl. .......... 169/61; 169/62; 169/16; 244/129.2; 340/514

[58] Field of Search .......... 169/46, 60, 61, 62, 169/16; 244/129.2; 340/515, 514, 644, 652, 653; 137/554; 361/190, 192, 193, 194

[56] References Cited

U.S. PATENT DOCUMENTS

| | | | |
|---|---|---|---|
| 2,378,404 | 6/1945 | Grant, Jr. | 137/554 |
| 2,399,553 | 4/1946 | Lindsay et al. | 169/62 X |
| 2,435,425 | 2/1948 | Cunningham | 361/194 X |
| 2,560,091 | 7/1951 | Davis . | |
| 3,100,017 | 8/1963 | Johnson . | |
| 3,174,550 | 3/1965 | Bugg | 169/62 X |
| 3,227,219 | 1/1966 | Boyer et al. | 169/16 X |
| 3,380,045 | 4/1968 | Lindberg | 340/514 X |
| 3,465,827 | 9/1969 | Levy et al. . | |
| 3,664,430 | 5/1972 | Sitabkhan . | |
| 3,683,239 | 8/1972 | Sturman | 361/194 |
| 3,825,766 | 7/1974 | Connor et al. | 169/61 X |
| 3,865,192 | 2/1975 | Dunphy . | |
| 4,082,148 | 4/1978 | Willms | 169/61 |
| 4,195,662 | 4/1980 | Göttel | 137/554 |

FOREIGN PATENT DOCUMENTS

| | | | |
|---|---|---|---|
| 699373 | 7/1979 | U.S.S.R. | 340/515 |

*Primary Examiner*—Robert J. Spar
*Assistant Examiner*—Edward M. Wacyra
*Attorney, Agent, or Firm*—Kokjer, Kircher, Bradley, Wharton, Bowman & Johnson

[57] ABSTRACT

A fire protection system is disclosed herein for use in aircraft equipped with engine and fuselage compartments. In the preferred and illustrated embodiment, the fire protection system utilizes a plurality of containers of extinguishant, the containers being connected to a common manifold. The manifold connects to a number of solenoid operated, feedback connected zone valves, each of which is connected through a distribution line to a specified fire zone of the aircraft. A control system is included which closes certain fire zone valves, opens the one where opening is required to direct the extinguishant to that particular zone of the aircraft, and then opens an individual container. The control system additionally includes sensors at selected locations around the aircraft to provide a warning to an operator who manually operates the system.

9 Claims, 8 Drawing Figures

METHOD AND SYSTEM FOR AIRCRAFT FIRE PROTECTION

BACKGROUND OF THE DISCLOSURE

This disclosure is directed to a unified fire extinguisher system for aircraft. It is particularly intended for aircraft provided with multiple engines and a fuselage located compartment, typically housing the flight crew, cargo, aviation equipment, passengers and the like. Fire protection systems in aircraft known heretofore can ideally be described as special hazard systems. For instance, a dedicated fire extinguisher system will be installed in proximity to an aircraft engine. Other protected areas may include a fuel tank, flight cabin, or some other piece of equipment deemed to be more of a fire hazard risk than the remainder of the aircraft. In some instances, it is known to utilize two containers of the extinguishant with an outlet valve for discharging one or more containers to a specific engine or area. The C5A military aircraft and Boeing 747 have systems which protect the cargo compartment. As will be appreciated, the term "cargo" applies both to aircraft configured to transport passengers and bulk cargo in the compartment area. This is usually a function of seating installed in the fuselage.

The present system (and apparatus) has an advantage over the equipment which is believed to characterize the prior art. The present apparatus utilizes multiple containers of extinguishant at a central location. They are much easier to service. Moreover, location of the several containers at a central location enables delivery of the extinguishant to a selected point where all of the available extinguishant might well be required. Consider the instance of a localized, but critical fire. The present invention is able to deliver extinguishant via a manifold system to the selected zone. If one container of extinguishant is exhausted, another can be brought onstream and also applied. Moreover, this can be accomplished without regard to the location of the alarm condition. This can be achieved by directing the extinguishant to an engine located at a wing-mounted position or other position such as a fuselage pylon or within the fuselage. It will function equally well if the fire hazard is created in the fuselage area or in an overhead engine compartment typified by the Laker aircraft, The subject system operates under control of the pilot or co-pilot, the controls for same ordinarily being installed with a control panel equally convenient to all flight deck personnel. While the precise location may vary, the present apparatus offers to the crew a system whereby the extinguishant supply can be checked. Likewise, the system permits the checking or testing of the valves connected to the common manifold so that valve condition and operation is verified. Extinguisher verification can be incorporated in a preflight checklist so that equipment is confirmed operative before takeoff. This particularly has an advantage over equipment believed to be representative of the prior art. Known prior art systems are thought to be deficient in that they utilize valves which cannot be routinely tested or checked by flight deck crews, and many times handchecking a valve connected to a fire extinguisher apparatus is difficult if not totally impractical to inspect. In most cases, the equipment will be in the armed or ready, but in a quiescent state for weeks, months or years, thereby making the possibility of a valve sticking a harsh reality. The present apparatus incorporates a means whereby the valve can be operated during preflight checkout, the operation confirming that the valve is either open or closed (as required) and further confirming that it is still operative so that it can switch to the desired state. This avoids the unwanted hazards and problems of known prior art equipment failures involving either a valve stuck either closed or open. If a valve is stuck open, it may well bleed off excessive quantities of extinguishant from the desired path of flow to distribute the extinguishant where no fire exists. Alternatively, if the valve is stuck shut, it may very well deny all extinguishant to the area where the fire is localized. In either case, the results are deemed to be catastrophic.

BRIEF SUMMARY OF THE INVENTION

The present invention relates to a system which is to be installed in an aircraft where designated fire area is often naturally defined by the construction of a firewall. Usually, it (the area) can be isolated to a lesser or greater extent by a surrounding shroud or structural member which isolates the area. Accordingly a single aircraft can be segregated into any number of specific fire zones, each of which can be individually protected through the use of the present invention.

The present system is particularly useful with intermediate size general aviation aircraft configured with wing supported engines and a fuselage located passenger compartment. Typically, the fuselage also supports the cockpit area with room for a pilot, co-pilot and the associated apparatus located therein. The apparatus is thus a system which utilizes a plurality of sealed extinguishant containers adapted to receive and hold a fire extinguishant. One popular fire extinguishant is Halon 1301 which is gaseous at ordinary pressures and temperatures, inert, and nonpoisonous to personnel. This compound is obtained from converting methane ($CH4$) into $CBrF3$. Containers of this extinguishant are secured at a location convenient for service. They are connected through outlet lines to a common manifold. The common manifold thus inputs one or more containers of extinguishant and outlets through a plurality of outlet valves. (It should be noted that a system could use only one valve which would be a 3-way valve with two containers.) Each outlet valve is solenoid operated and incorporates a switch therein which indicates its operative position. Each outlet valve connects to an outlet line which then extends from the valve on the common manifold (or just from the valve) to the designated fire zone for that line and valve. A control system is also incorporated which, in conjunction with an instrument control panel, enables aircraft personnel to trigger the equipment into operation.

BRIEF DESCRIPTION OF THE DRAWINGS

In the accompanying drawings, which form a part of the specification and are to be read in conjunction therewith, and in which like reference numerals are employed to indicate like parts in the various views.

DETAILED DESCRIPTION OF THE PREFERRED EMBODIMENT

Figure 2A:
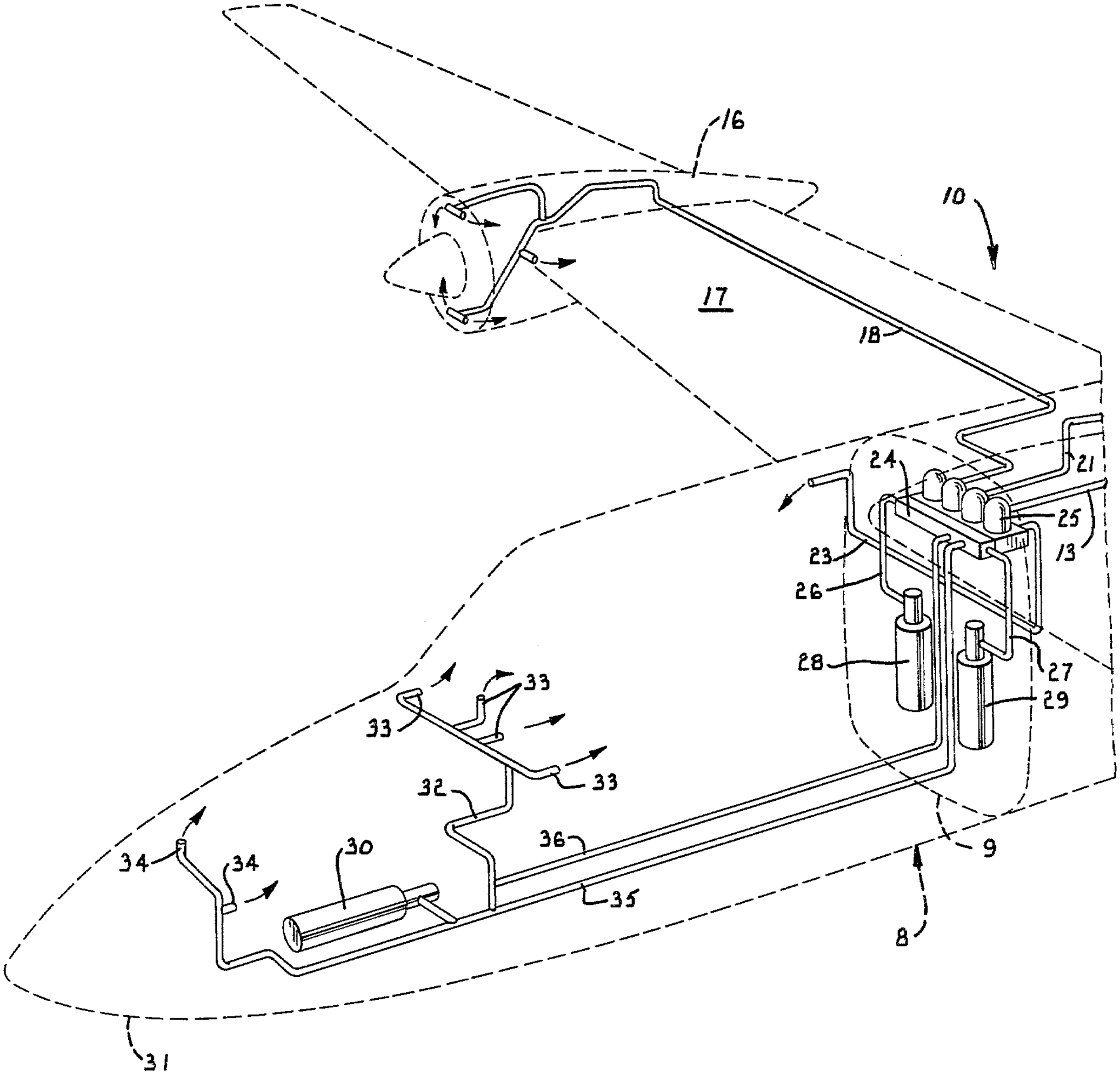
FIG. 2 (comprised of sheets 2A and 2B) discloses the present invention installed on an aircraft where the aircraft is represented in broken line and thereby identified as supporting structure and where the fire extinguisher system is deployed throughout the aircraft to provide zone protection.
Figure 2B:
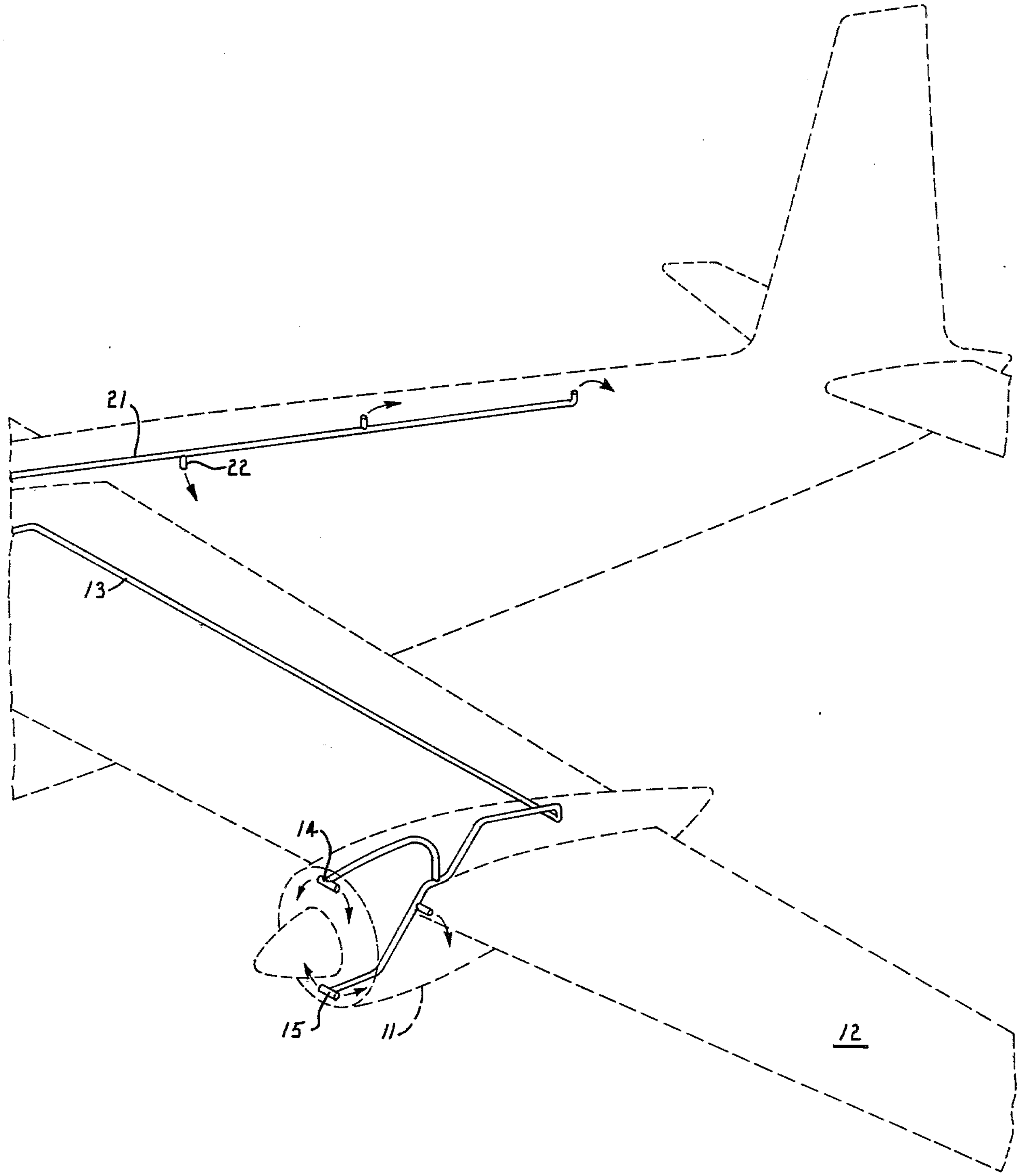

Attention is first directed to FIG. 2 of the drawings where an aircraft 8 is disclosed as support structure. It is a typical aircraft in which the present apparatus is installed. The aircraft 8 has a pair of engines which are wing-mounted, a forward or pilot's compartment with room for pilot and co-pilot and a central fuselage area adapted to carry cargo or passengers. The central area includes a transverse bulkhead 9 which is support structure for mounting the fire extinguishant system of the present disclosure. The bulkhead 9 can be located at some convenient, readily accessible location. Accessibility is desirable, although not mandatory. It is desirable in that the extinguishant containers are preferably serviced periodically to confirm an adequate supply of extinguishant. Moreover, it is desirable that their location be central so that the length of lines which extend from them is held to a minimum. The aircraft 8 can be readily varied in type and configuration so that this structure can be adapted to other aircraft.

The fire extinguishant system of this disclosure is generally identified by the numeral 10. The deployed system will be described first, referencing FIG. 2 of the drawings.

Extinguishant System Construction

The numeral 11 identifies an engine cowling attached to a wing 12. The wing 12 is of typical construction and incorporates a typical engine (piston, turbo prop or pure jet) 11 within a cowling. In any event, the engine is received in the cowling 11, and the cowling 11 defines what will be identified as a fire zone. For this disclosure, it is identified as the left engine fire zone. The engine compartment can be divided into one or more fire zones depending on the organization of the engine, the availability of firewalls, shrouds and the like which define other fire zones. Whatever the circumstances, one or more fire zones are defined in the engine compartment. The present invention contemplates a flow line 13 which extends through the wing 12 from the fuselage to the cowling 11. The flow line 13 branches into several outlets and terminates at several nozzles. One nozzle is identified by the numeral 14, while another nozzle is identified by the numeral 15. The precise number of nozzles is subject to variation. They are installed at strategically selected locations so that extinguishant expelled through the nozzles will suppress fires arising in the engine cowling 11. To this end, the line 13 branches into one or more branches which terminate at the several nozzles which are deployed within the fire zone generally described as the left engine fire zone. It will be appreciated that the engine can be divided into more than one compartment, and more than one flow line can extend to it.

The present invention utilizes equipment of the same sort deployed for the right engine. The right engine is thus identified as comprising the cowling 16 on the right wing 17. A flow line 18 extends to the right engine along the wing 17. It terminates in a plurality of nozzles which are deployed in similar fashion to that for the left engine.

FIG. 2 discloses that the aircraft 8 incorporates a fuselage 20, and the fuselage is protected as a defined fire zone. The first zone within the fuselage 20 is behind the bulkhead 9 and is protected by a line 21 which terminates at a plurality of nozzles, for instance, the outlet nozzle 22. The several nozzles, again, are deployed in a stragetic fashion. Another fire zone is defined forward of the bulkhead 9, and, to this end, a line 23 extends toward the forward fire zone. The line 23 connects with the common manifold mentioned earlier. The manifold, itself, is identified by the numeral 24, and it supports a plurality of identical solenoid operated valves 25. The several valves 25 commonly connect to the manifold and then connect to one of the flow lines, for instance, those designated for the engines or the fuselage. Each flow line has its own designated solenoid valve. The common manifold 24 has inlet lines 26 and 27 which connect with containers 28 and 29 which are strapped to the bulkhead 9. The containers 28 and 29 store the extinguishant material which is delivered through the flow lines 26 and 27.

The present apparatus includes an additional container 30 for receiving and securing a supply of fire extinguishant material. It is located in the nose area of the aircraft, the nose being identified by the numeral 31. A line 32 extends to a number of nozzles 33 in and about the flight deck and instrument panel area. Nozzles 34 are also included on a parallel branch from the line 32, the nozzles 34 being located at the compartment area in the nose 31. This is typically an area for receiving luggage or avionics or heaters, depending on the configuration of the aircraft. The container 30 is located in the nose 31 and is similar to the extinguishant containers 28 and 29. The nose container 30 can be plumbed in like fashion as the other containers, namely, by connecting through a line 35 to the common manifold and then returning a line 36 for the nozzles 33 and 34. In other words, it can be deployed in the nose, but connected through the common manifold. An alternative arrangement is to connect the nose container 30 directly to the nozzles 33 and 34 through the line 32. The latter case will be presumed in the installation described hereinafter. It will be noted, however, that the lines 35 and 36 which extend to and from the common manifold enable it to be integrated into the remainder of the apparatus and to function as a system with it.

System Construction

As described above, the equipment is particularly able to distribute the extinguishant to the fire zone requiring attention. This is accomplished through the control system which will now be described. The control system of the present apparatus is better understood by referring to FIG. 1 of the drawings, it being noted that this is formed of several sheets. The conductors which are shown in the several sheets of drawings extend to adjacent sheets, and a key for their interconnection is found at FIG. 1D. Moreover, the system which is shown in the several sheets incorporates two zone valves and three extinguisher containers. This is the type of system which might be installed in a smaller aircraft such as a Cessna Citation. Arbitrarily, the two fire zones which are defined are the cabin and nose compartment as the front part of the fuselage and the aft portion of the fuselage. The aft portion is defined, again, by the bulkhead 9 which is depicted in FIG. 2 of the drawings. Needless to say, the border between the fore and aft fire zones can be defined in some other fashion and other zones can be defined and protected.

Certain assumptions must be made about the aircraft. Presumably, it is equipped with typical or well known 28.0 (or 12 volt) volt DC power systems. Moreover, it might well be equipped with two power systems. While all the power aboard the aircraft is derived from the battery of the aircraft which, in turn, receives power from the generators, the aircraft power systems are typically subdivided so that there is a full system which powers all the equipment and a more basic power system which powers that apparatus which is essential for operation in emergency circumstances. These are the things necessary to get an inflight aircraft to the ground. There are a number of ways to wire the aircraft, and, to this end, one such approach is to include the apparatus of this disclosure on the emergency system so that it is furnished power along with the other equipment necessary to get the aircraft safely to the ground.

Figure 1A:
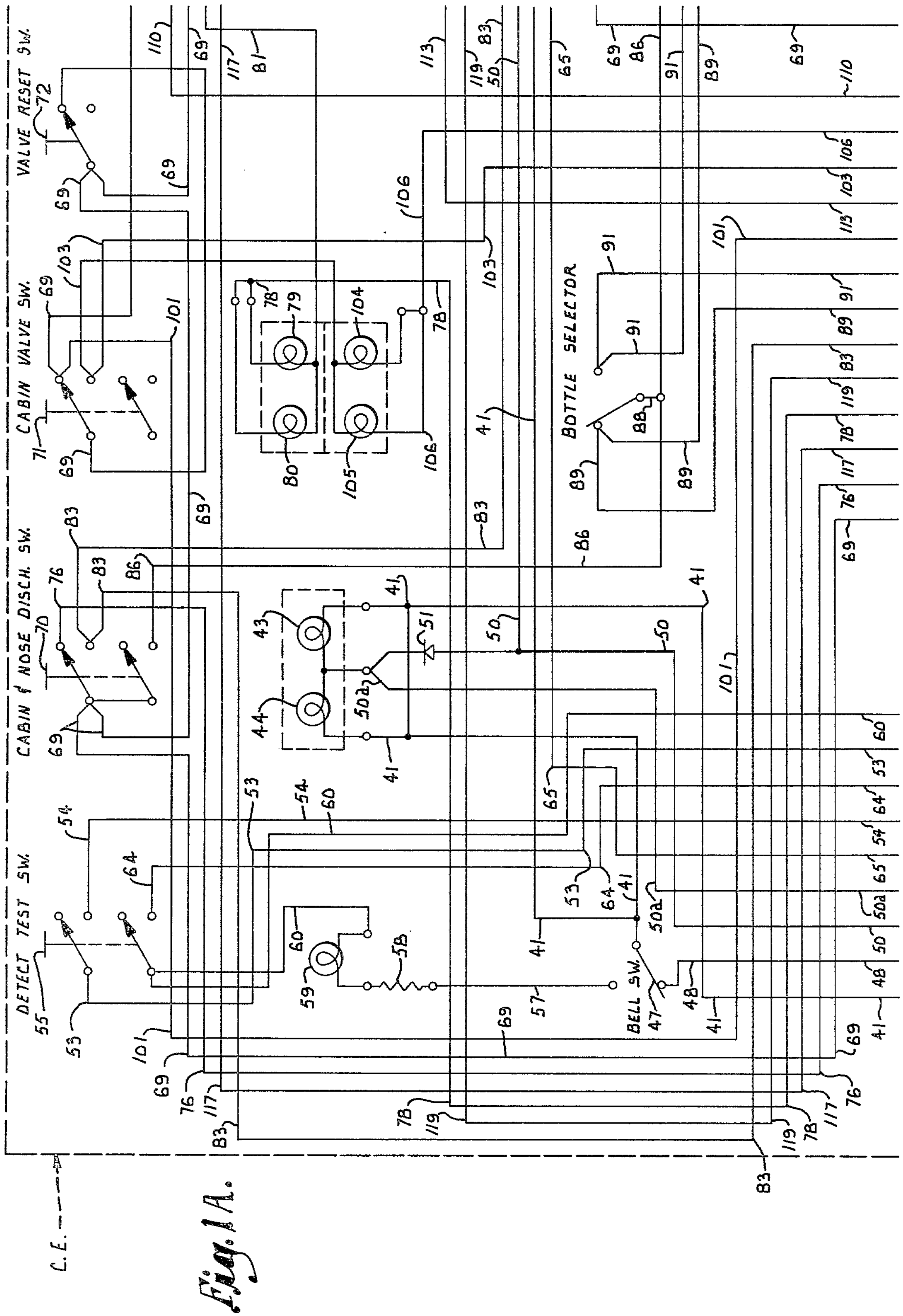
FIG. 1 is a schematic wiring diagram comprised of Sheets 1A, 1B and 1C which, when considered together, disclose the control system for the apparatus of the present invention, including means for actuating the extinguishant flow.
Figure 1D:
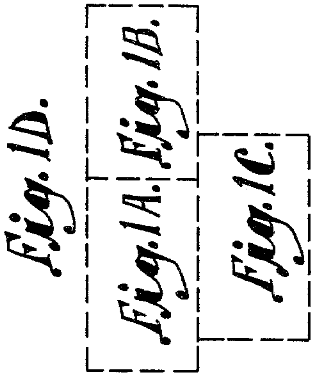
Figure 1B:
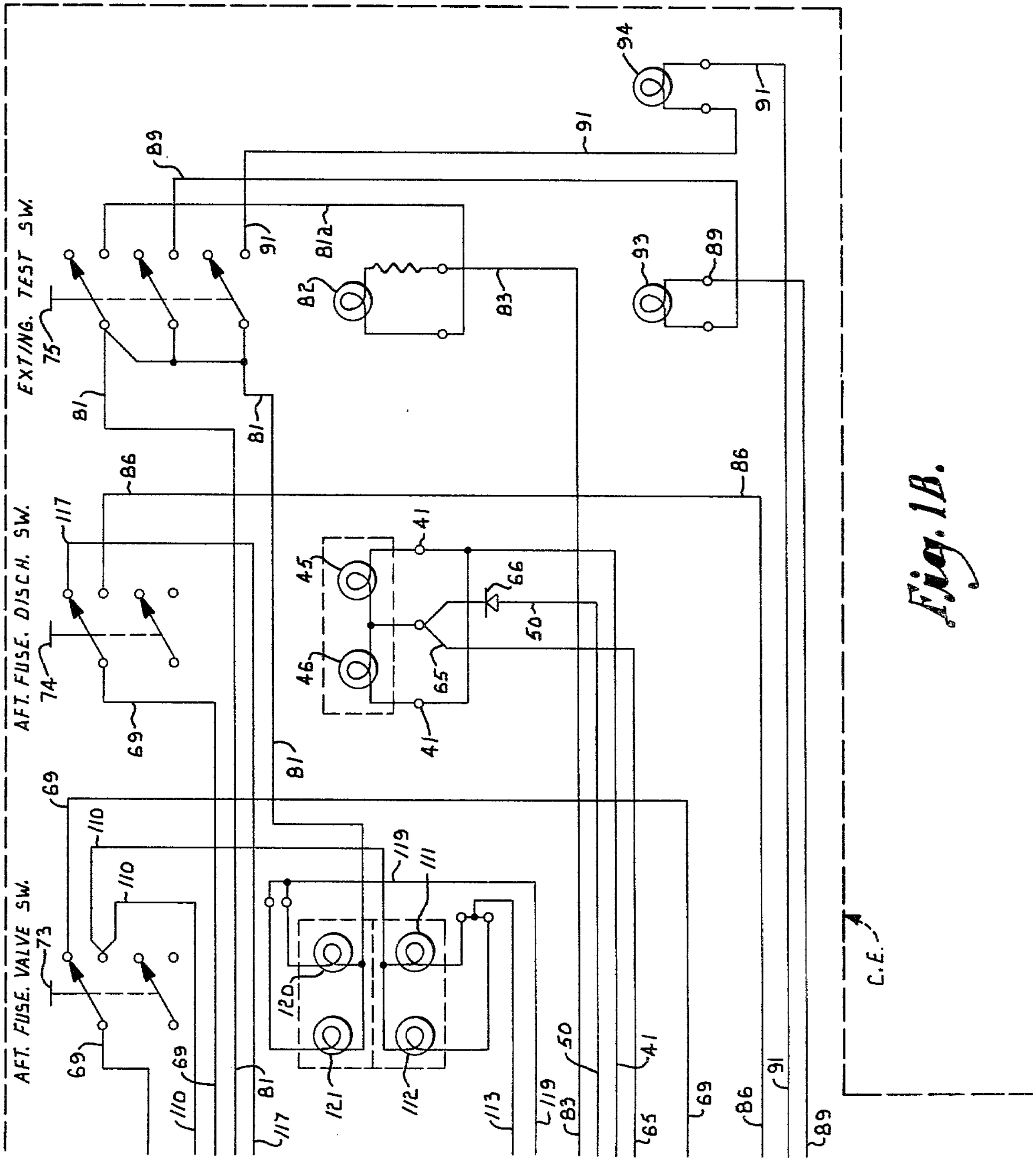
Figure 1C:
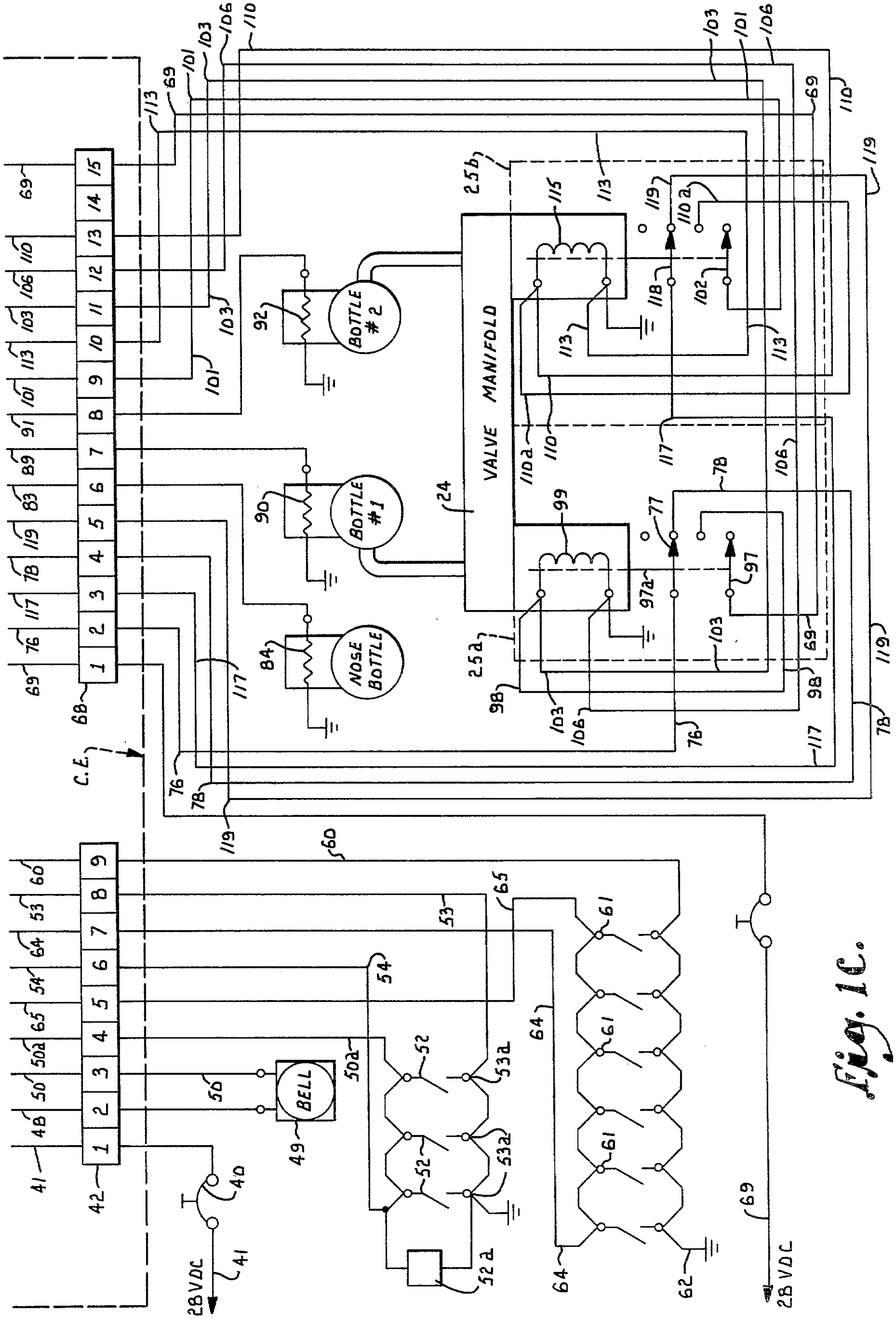

The numeral 41 thus identifies in FIG. 1*c* a power lead which is a source of power from a suitable bus aboard the aircraft and is typically 28.0 volts DC. It is a conductor that is powered by the normal aircraft DC bus which is usually switched on and off by this battery switch (master switch). The conductor 41 thus passes through a circuit breaker 40. The conductor 41 extends through a mated connector pair 42 (incorporated for convenience in installing and removing the equipment) and thereafter extends to a lamp 43. Conductor wire 41 branches and connects to a parallel lamp 44, the two lamps being incorporated for symbolizing to the operator that a "fire warning" exists. Two lamps provide redundancy. The conductor 41 also extends to the lamps 45 and 46 which are located on FIG. 1*b*.

The conductor 41 is the power input line and is, therefore, deemed to be the hot or supply line. It connects to the bell switch 47 shown in FIG. 1*a*. The bell switch 47, in the on position which is illustrated, provides power over a conductor 48 which is then supplied through suitable fittings and conductors to the bell 49. Power which is supplied to the bell provides current flow for its operation.

The return circuit utilizes the conductor 50 which passes through the third pin of the fitting 42, and the conductor 50 extends through a diode 51. The conductor 50*a* thus extends away from the control equipment which is shown as being enclosed within the broken line C.E. extending through FIGS. 1*a*, 1*b* and 1*c*. Broken line C.E. identifies that portion of the equipment localized in the cockpit area in a housing.

Conductor 50*a* emerges through the pin and socket fitting 42 at pin 4 and extends to a selected or designated fire zone area for connection with a plurality of condition sensors. In this instance, the conductor 50*a* extends to a first one of the sensors 52. Second and other sensors 52 are included, and may be of identical construction or designed to respond to different conditions (temperature, optical, etc.). They are connected parallel to one another with the precise number being variable. In the preferred embodiment the several sensors are located within a designated fire zone area. Being in parallel, the several sensors electrically function in the same manner, namely, they are open at temperatures which are deemed to be safe, and they close at a designated temperature level. When closure occurs, the sensors 52 form a signal by permitting current flow. All of the sensors thus connect to ground. It is important to note that the sensors do not "trigger" the system and that the 2 impact switch assembly sets the system to a pre-determined configuration and then discharges the predetermined container.

The conductor 50*a* thus connects with the several sensors. When an alarm condition occurs, the alarm circumstance is detected by one of the several sensors, and a signal is formed thereby on closure of a sensor's normally open contact. When any one of the several sensors closes, it pulls the hot side (41) close to ground potential as a result of voltage drop across lamps 43 and 44. This signal occurs on a conductor 50*a* and goes through closed sensor 52 to aircraft ground 53*a*.

In a test condition, it will be observed that the conductor 54 is tied to the high voltage side of the several sensors 52 and returns through the pin 6 of the connector 42. The conductor 54 then connects with a detect test switch 55 in the upper left corner of FIG. 1*a*. The switch 55 is a pushbutton operated, double-pole, double-throw switch. It is made double-pole because only two fire zones exist in this configuration. If there were three or more fire zones, it would be a triple-pole, four-pole, etc., switch. The number of poles on the switch would match the number of fire zones of interest. The first fire zone is thus protected by the sensors 52. The detector test switch 55 simulates action of the sensors 52 so that closure of the test switch 55 momentarily simulates closure of one of the sensors, thereby enabling a test of a warning system and its display on the control panel.

The switch 55 is wired so that the conductor 54 is momentarily grounded by connection to the conductor 53. The conductor 53 extends from the switch 55 in FIG. 1*a* back through pin 8 of the fitting 42. It then connects physically away from the control panel to the sensors 52. It is important to note that the conductors 50*a*, 53, and 54 may extend many feet along the fuselage of the aircraft from the cockpit area to the sensors. The test equipment thus actually tests the sensors which are installed at remote locations including all the conductors utilized for the sensors. The fire alarm equipment thus implements a test of the sensors (that they are in an open condition and operable within the system) as well as the wiring associated therewith.

It should be noted that FIG. 1*c* discloses that only a single point ground 53*a* for the sensors 52 exists. This is another installation feature which enhances the integrity of the system, preventing malfunctions of individual sensors without confirmation. In other words, a single depression of the switch 55 will test all of the sensors shown in the system. The test extends to the various sensors and the conductors for them including the single point ground shown (53*a*).

When the switch 55 is closed in testing the equipment, the bell 49 sounds. The bell can be defeated by switching the switch 47 to the normally open position which will be labeled "off" on the control panel. As shown in FIG. 1*a*, the switch is thrown to a position which activates the bell 49. The switch 47 is operated to provide power to a conductor 57, which, in turn, connects through a series dropping resistor 58 to LED 59. The LED 59 is placed on the control panel and functions alternatively to the bell. The LED 59 is provided with a ground through a conductor 60 which will be described in detail hereinafter. Accordingly, when the bell is not ringing (off), LED 59 is illuminated to signal to the operator that he has taken action which switches the bell off. It is desirable that either the bell will ring or LED is illuminated (indicating that the bell has been switched off) in an alarm condition.

Provided that the bell switch 47 is in the ON position, bell 49 will ring if a second set of sensors, in a second location, indicates that an alarm condition has occured in a second or different fire zone. To this end, a second set of sensors is incorporated at 61. Sensors 61 are located in the second zone and are provided with a common ground connection at 62 similar to ground 53*a* described above. They are additionally provided with a common ground conductor 60 previously identified. The ground conductor 60 extends from FIG. 1*c* to the second set of terminals in the detector test switch 55. As indicated above, switch 55 has a set of poles for each zone. The topmost set of poles shown in FIG. 1*a* is provided for the sensors 52. The bottom set of poles is incorporated for the second zone sensors 61. The numeral 64 identifies the conductor which is connected with the conductor 60 when detect test switch 55 is operated. The conductor 64 passes through the pin 7 of the fitting 42 to provide a parallel path to the sensors 61. As a result, the closure of the switch 55 emulates closure of one of the sensors 61 in that hot and ground connections are completed. This test routine is similar to the test routine previously described. The conductor 64 thus connects in common to the several sensors 61. The sensors 61 are provided with power by a conductor 65 and extends to the several sensors from the control panel within the broken line C.E., the conductor 65 passing through pin 5 of the fitting 42. Conductor 65 thus extends from the fitting 42 on FIG. 1*c*, passes through FIG. 1*c* and then connects to the lamps 45 and 46. Power from the conductor 65 is supplied via line 41 and lamps 45 and 46.

The diodes 51 and 66 isolate or block power applied to the respective duplicate fire alarm detection circuits so that the power from the bell circuit will not illuminate all fire warning zone lamps. For purposes of this disclosure, one detection circuit is hereinafter described as the cabin and nose fire zone, and the other is the aft fuselage fire zone. The first or forward zone which includes the cabin and nose utilizes the lamps 43 and 44 and is connected to the sensors 52. The aft fuselage fire zone utilizes the lamps 45 and 46. Without diode 51 in line 50, when a sensor 61 closed power would flow as described above, it illuminates lamps 45 and 46. However, the bell 49 would likewise ring because of the voltage on line 41 to 46, through switch 47, then to bell 49 (via pin 2 of connector 42 and then via line 50, pin 3, to the ground side of lamps 45 and 46, then via line 65, pin 5 of connector 42 to sensor 61 and then to ground 62). But lamps 43 and 44 would also illuminate, indicating a fire in the zone of sensor 52, without diode 51 by the following current path: line 41 to lamps 43 and 44 to line 60 to ground side of lamps 45 and 46, then via line 65, pin 5, connector 42 to closed sensor 61, and to ground 62.

Both sets of sensors can be silenced by operating the bell switch 47, which, in turn, illuminates the lamp 59. Both sets of sensors are simulated by closure of the switch 55, the switch 55 having poles thereon equal in number to the number of fire zones. All of the equipment described in this juncture is powered by the inlet line 41 through the circuit breaker 40.

As suggested above, the equipment can be configured differently. For instance, if three fire zones are required, the switch 55 will be a three-pole, double-throw switch. Each particular zone is protected by one or more sensors, the sensors being deployed in parallel circuit connection. Each zone is preferably provided with its own dedicated power line for the sensors and ground return. In actual practice, each set of sensors is shown with three conductors, one conductor being the power line providing power for the sensors and the remaining pair of conductors providing parallel lines through which the detector test switch 55 simulates operation of the sensors.

Extinguishant Operation Circuitry

The connector 42 which is comprised of mating pin and sockets incorporated for easy connection to a wiring harness which connects with the several sensors deployed in the various fire zones. Another connector formed of a plug and socket is identified at 68 and is utilized with the wiring harness. The numeral 69 identifies a second inlet line for the apparatus which is found in the lower left corner of FIG. 1*c*. It connects through a suitable circuit breaker and then passes through the pin 1 of the plug and socket connector 68. The conductor 69 is the power source for the fire extinguisher apparatus. It will be recalled that a separate power source is furnished for the fire detection equipment described above.

The conductor 69, being the power main, is supplied to several locations. As stated above, this embodiment is configured for three fire zones, even though the cabin and nose section as disclosed therein are protected simultaneously. One is in the forward part of the fuselage and is labeled the cabin and nose section. The other is labeled the aft fuselage section. Each of the two sections is activated by several switches. The forward section thus incorporates a switch 70 which is the discharge switch. A second switch associated with the forward or cabin area is the valve switch 71. A third switch is the valve reset switch 72. The aft portion of the fuselage is a separate fire zone which is provided with an aft fuselage valve switch 73 and an aft fuselage discharge switch 74. Lastly, an extinguisher system test switch 75 is included.

When an alarm condition exists for the cabin and nose zones, lamps 43 and 44 will be illuminated. These lamps are physically located within the pushbutton of switch 70, thereby alerting the pilot or operator of the system of a particular zone problem. As indicated above, switch 70 is a pushbutton operated, spring return, double-throw, double-pole switch. When power is provided to the lamps to indicate an alarm condition, switch 71 is operated, then switch 70 is thereafter operated. The switch 70 is preferably provided with a hinged cover or other protective device which prevents its accidental actuation. It is preferably detent protected and spring returned so that it must be continuously pressed in ordinary circumstances. Operation of the switch 71 (cabin valve switch) defeats operation of the common manifold valves which route extinguishant to other fire zones.

Figure 3:
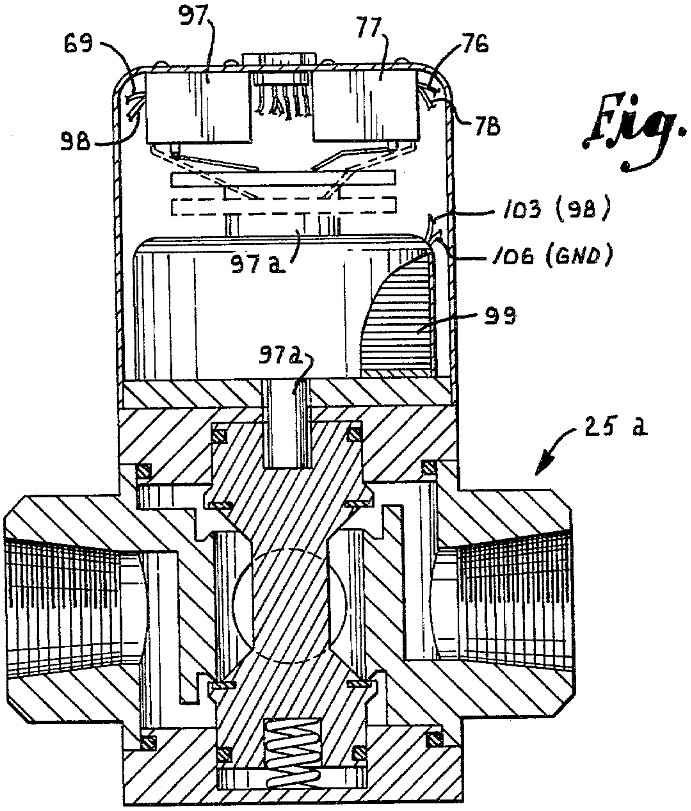
FIG. 3 is a partial sectional view of one of the typical solenoid operated valves used in the system with the micro-switches shown engaging the valve actuator and having a solid line and a broken line position.
Figure 4:
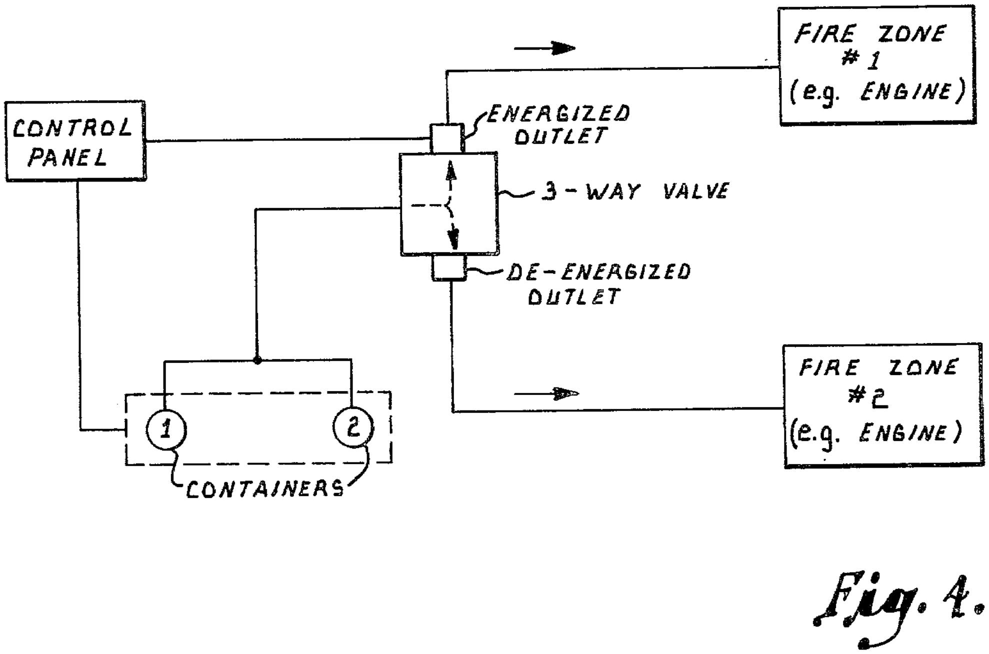
FIG. 4 is a schematic diagram of a scaled down system (from that shown in FIG. 1) using a 3-way valve similar to that shown in FIG. 3.

In system operation, the conductor 69 has a voltage condition thereon. At the switch 70, the conductor 69 furnishes power to the left-hand side of the switch. The conductor 76 is energized in the normal off position of FIG. 1*a*. The conductor 76 connects to the pin 2 of the connector 68. The conductor 76 continues to the switch contacts shown at the valve 25*a*. It will be recalled that the valve manifold 24 is commonly connected to several solenoid operated valves 25. Two identical valves are identified in FIG. 1*c* by the numerals 25*a* and 25*b*. The common manifold 24 is also represented in the schematic to show its position relative to the solenoid operated valves 25. Each valve incorporates a coil 99 which is energized or deenergized and which opens and closes the valve via the movement of an actuator arm (see arm 97*a* in FIG. 3 and 1*c* as an example of same). Each valve thus includes the following components. Each valve has an inlet and outlet passage past a valve element which blocks or opens to permit flow through the valve (conceivably, a single pushbutton and a three way valve could be used to protect two separate fire zones with one or more containers, see FIG. 4). Each valve incorporates the solenoid shown in schematic representation in FIG. 1*c* which moves the valve element between open and closed positions. Each valve also includes switches which are operated by or follows the valve element when it moves. Simply stated, the solenoid operates, moving the valve element, and this, in turn, opens a particular switch. The mechanical connection shown in FIG. 1*c* extending from the coil to the switch terminals thus incorporates the valve element. The switch terminals are not operated unless and until the valve element, itself, moves. Through this arrangement, it can be verified that the valve has actually opened, and this signal is formed for confirmation by the circuitry included in FIG. 1.

The conductor 76 passes through the switch 77 of the valve 25*a*, onto the conductor 78 and then to the pin 4 of the connector 68. Conductor 78 extends to FIG. 1*a* and eventually to lamps 79 and 80 which are illuminated in a test mode. These lamps indicate that the cabin valve 25*a* is closed and will prevent flow of extinguishant into the occupied cabin. Similarly, lamps 120 and 121 illuminate, indicating aft fuselage valve 25*b* is closed and will prevent flow of extinguishant into the aft fuselage. Lamps 82, 93 and 94, as will be described, will be illuminated also to indicate that the bottle discharge circuits and the electrical actuator on each bottle are operable. Current which flows through the conductor 76 and then the conductor 78, after passing through the parallel lamps 79 and 80, flows through the conductor 81 to FIG. 1*b* to the extinguisher test switch 75. The test switch 75 is a pushbutton operated, momentarily closed test switch having double-throw, triple-pole construction in the illustrated embodiment. The first set of poles includes the conductor 81. When the extinguisher test switch is in the normal untended condition, it is open as illustrated. When it is momentarily closed, the conductor 81 is then connected via line 81*a* to an LED 82, and the lamp is illuminated, being serially connected in the conductor 81. The lamp is connected on its low voltage side to a conductor 83, the conductor 83 extending to FIG. 1*a* to the first set of poles in the discharge switch 70. Further in the test mode, the circuit extends via line 83 to pin 6 of connector 68 and thence via line 83*a* to the electrical actuator 84 on the nose bottle and then to the ground. The above describes how the test circuit confirms that the zone valves are closed and that the bottle electrical actuator and its associated discharge circuit are operable.

In a similar manner, operation of the test switch 75 results in the testing via lines 89 and 91, lamps 93 and 94 and bottles (and associated circuits) #1 and #2 respectively to show that the associated electrical actuators and discharge circuits are operable. When the lamps do not illuminate, this indicates a non-operable condition or malfunction in the respective circuit.

As suggested above, conductor 83*a* (FIG. 1*a*) continues from pin 6 of connector 68 through the electrical actuator 84. This actuator is of the type that will explode and rupture a scored diaphragm disc seal that is associated with each bottle (container) of extinguishant. However, when the current flow through the actuator 84 (indicated in the drawing as a resistance element) is low, such as would be the case during a test, no explosion would occur. Idealy, lamp 82 is an LED having a series resistance of a specified minimum. Since all current eventually flowing through conductor 83 and 83*a* passes through lamp 82, the inherent resistance therein holds the current to the acceptable low level during the test operation. Similarly, lamps 93 and 94 are associated with the testing of bottles #1 and #2 and actuators 90 and 92 respectively.

Operation of the switch 70 shorts the conductor 83 by connecting it directly with power on conductor 69. This avoids directing current through the lamp 82 and raises the current at the actuator to a level needed to insure proper operation thereof by reducing the resistance between the power source and associated ground. As the current flow is increased, the actuator then explodes, breaks the disc, and releases the extinguishant (through two bottles and the cabin zone valve 25*a*) to the protected areas of the nose compartment, cockpit and occupied cabin.

As described to this juncture, the nose container has been released to permit extinguishant to flow therefrom. However, the preferred system includes other containers which are shown in FIG. 1*c*, and which function in a similar manner described hereinafter.

As suggested, before desired discharge switch is operated (70 or 74), its associated valve switch (71 and 73 respectively) would first be operated. Returning to discharge switch 70, power is applied to the first set of poles thereon and is outputted either on the conductor 76 or the conductors 83. When the switch is actuated, power is delivered through the second set of poles to the conductor 86 which extends to the normally open contact of the first set of poles on aft fuselage discharge switch 74. At the same time, power from the conductor 69 goes onto conductor 86 so that it can be powered from either end and thereby is delivered to the bottle selector switch 88. The selector 88 is thus supplied by either the forward or aft fuselage discharge switch 70 or 74.

When power is provided to the bottle selector switch 88, it then outputs power to select one or the other of the two bottles (containers) shown as 1 and 2 in FIG. 1*c*. In the illustrated position (FIG. 1*a*), power is delivered from conductor 69 via the switch 88 to a conductor 89. The conductor 89 extends from FIG. 1*a* through the connector 68 (pin 7) and to the actuator 90 via line 89*a* and thence to ground. As described above, the explosion of actuator 90 delivers vaporized extinguishant into the valve manifold 24 and is routed to the nozzle in the selected fire zone through the zone valves (either 25*a* or 25*b*) that has been actuated. Selector switch 88 may be operated to energized the conductor 91 instead of conductor 89. Conductor 91 passes through the pin 8 of the connector 68 and eventually (via line 91*a*) connects through actuator 92 to ground. The actuator 92 is similar to the actuators 84 and 90. A rotary switch can be used in lieu of the switch 88 to select a multitude of containers of extinguishant via their associated actuator and more than one bottle (container) could be associated with each such circuit selected.

The terminals of the selector switch 88 additionally provide a connective path for the conductor 89 so that it will cause the illumination of lamp 93. Lamps 93 and 94 are illuminated during test by the circuit including test switch 75 and conductors 89 and 91. These lamps will not illuminate after bottle discharge because the associated actuator (90 or 92) has been destroyed and therefore no circuit to ground.

It will be observed that the present apparatus is wired with double lamps at most locations. This provides protection against failure of a lamp. Where double lamps are not used, an LED is preferred.

It will be recalled that the cabin and nose discharge switch 70 discharges the nose container. In this circumstance, it was presupposed that the nose container was connected directly to a set of nozzles which open into the portion of the aircraft of interest, but without operation of a solenoid valve. Accordingly, the cabin valve switch will now be discussed. With the valve reset switch 72 in the illustrated position (FIG. 1*a*) the power line 69 is connected to input power to the cabin valve switch 71. In the illustrated position of the switch 71, the power is furnished through the conductor 69 and thence to the aft fuselage valve switch 73. The first set of poles in the switch 73 (FIG. 1*b*) provides power over the line 69 which is inputted through the pin 15 of the connector 68 to the solenoid valve 25*a* and the contacts of position switch 97 shown in FIG. 1*c*. This is the first of a duplicate set, it being appreciated that there can be any number of solenoid valves incorporated. The conductor 69 is thus input to the switch 97, and, when the valve 25*a* is operated by switch 71, power is supplied by the switch contacts 97 to the conductor 98 and thence on the solenoid coil 99 of valve 25*a*, the other end of coil 99 being grounded. The solenoid is mounted with respect to the valve 25*a* to actually open or close same. In the illustrated embodiment, the solenoid pushes the valve to an open condition. The switch 97 sustains the open condition so that the solenoid is self-latching.

In operation, the actuator of switch 97, shown by the broken line 97*a* (in FIG. 1*c*) that extends through coil 99, follows the movement of the internal parts of the valve as they move from the closed to the opened position thereby providing the latching current only when the valve is open.

Lamps 104 and 105 are connected in parallel with coil 99 through conductors 103 and 106 and pins 11 and 13 of connector 68 so that they (104 and 105) will illuminate only when power is being supplied to coil 99. Furthermore, switch 97 insures that power will be supplied to coil 99 only if the valve 25*a* is open, thereby providing a positive indication of the valve's physical position. Anything causing valve 25*a* not to open would be initially indicated by the following: Lamps 104 and 105 would not illuminate when switch 71 was actuated but would not remain on when switch 71 was released because switch 97 was unable to establish a latch condition.

Conductor 98 provides power to extend the self-latching feature in operation of the solenoid. It will be observed that the aft fuselage valve switch 73 is interposed in the latching circuit. Accordingly, the opening of a valve by operation of the cabin valve switch 71 requires the closure of other valves. In other words, the switches 71 and 73 and interdependent so that the switch 71 is operated for the opening of a single solenoid valve, requiring the closure of other solenoid valves. The other solenoid valve 26*b* (associated with the aft fuselage valve switch 73), may already be open. It is desirable to open only one solenoid valve at a moment in time, and to this end, the latching current for valve 25*a* passes through the normally closed contacts of valve switch 73 so that if valve switch 73 is actuated in order to open valve 25*b*, the latching current on 25*a* will be interrupted, thereby closing valve 25*a* and switch 97 can no longer provide the "latch".

The cabin valve switch 71, via its topmost poles, provides power on a conductor 101 which extends through FIG. 1*a* to pin 9 on connector 68 (FIG. 1*c*) and extends further to the second solenoid valve 25*b*. Line 101 is connected through the position switch 102 (similar to the switch 97 shown in the other solenoid valve 25*a*) and power is likewise provided to make the second of the two solenoid valves (25*b*) self-latching if and when that solenoid valve is open. It will be appreciated that the cabin valve switch 71 (illustrated in the unoperated position) continues to apply power to the contacts 102 in the second solenoid valve 25*b*.

In operation, closure of the switch 71 operates the solenoid 99 by applying power to the hot side. A direct indication that the valve has opened involves the conductors 98 and 106 and further may involve temporary opening of the valve to confirm that it will open. Opening for test purposes is relatively shortlived, usually during preflight tests. By contrast, opening for a first extinguishing operation is sustained by including a self-latching feature utilizing the switch 97.

Switch 72 (valve reset switch) is preferably a push-button operated, spring returned switch. It is connected between the power line 69 and the cabin valve switch 71. When it is actuated, it denies power to the aft fuselage valve switch 73, thereby terminating operation of the solenoid valve 25*a* in that the current to switch 97 is interrupted. The valve reset switch 72 thus overcomes the self-latching feature built into the system for the zone valves 25*a*. Also, reset switch 72 provides latching power to valve 25*b* via the line 69 to normally closed contacts of cabin valve switch 71 so that when valve 25*b* is open and so latched by its position switch 102, movement of the valve reset switch 72 will interrupt current to switch 71, line 101, pin 9 and eventually to switch 102. In this manner, valve 25*b* is permitted to close since no current exists to coil 115 on line 11*a* once switch 102 opens.

The aft fuselage valve switch 73 is provided with power via the quiescent state of the cabin valve switch 71. Accordingly, the switch 73 is priority interdependent. In its quiescent state, switch 73 connects to switch 97 in the solenoid valve 25*a*. When switch 73 is actuated to open valve 25*b*, power is applied to conductor 110 and parallel lamps 111 and 112 as lamps 104 and 105 were energized through conductor 103. Ground 113 (for lamps 111 and 112) connects from FIG. 1*a* and eventually extends to pin 10 of the connector 68 in FIG. 1*c*. The conductor 113, in turn, connects to the ground terminal of the solenoid 115 which is incorporated in the valve 25*b*. This provides a positive indication that valve 25*b* is open as described with valve 25*a*.

Going again to the aft fuselage valve switch 73, actuation of it applies power from the line 69 to the conductor 110 which has a second branch. The second branch connects through the pin 13 of the connector 58, being routed across FIG. 1*a* and connected to the solenoid coil 115 to provide power for its operation. The solenoid 115 is thus energized by power over the conductor 110. When this occurs, it will be recalled that operation of switch 73 interrupts the latching current of valve 25*a* or any other open valve.

The switch 74 is, itself, provided with power from line 69. In its quiescent state, power is applied to a conductor 117. The conductor 117 crosses FIG. 1*a*, connects with pin 3 of the connector 48 and then connects to solenoid valve 25*b* and passes through a second position switch 118 incorporated therein. The switch 118 is normally connected when the valve is in the inactive or closed position to conductor 119. The conductor 119 is used to confirm that the valve is closed. Confirmation is routed from the conductor 119 from the solenoid valve 26*b* out through pin 5 of the connector 68, and the conductor 119 (FIG. 1*a*), terminating at lamps 120 and 121, which are connected in parallel. These two lamps are incorporated to form a visual indication of the operative status of the valve 25*b*. If the valve is closed, these lamps are illuminated in parallel, one being incorporated as a backup against failure of the other. The lamps are grounded by connection to the conductor 81 previously defined and will only illuminate when the extinguisher test switch 75 is actuated.

A significant and important feature of the invention resides in the ability to offer a simple and effective test procedure for the system operator, usually the aircraft pilot. As suggested above, the sensors can be individually tested. When they operate, the sensors 52 or 61 sound the bell 49 and illuminate lamps 43 and 44 or 45 and 46 respectively. The bell can be switched off or on. It is held on by the switch 47 and sounds as long as the switch remains in the illustrated position. When the switch 47 is reversed, a LED lamp 59 illuminates to replace the noise of the bell. The bell and/or the affected lamps persist until the alarm condition has terminated as, for instance, by cooling whereby the closed sensor can thereafter open.

The detectors are tested collectively along with the test route which includes the wiring for the sensors and the control panel alarm (visual and audible). An application of test heat to actuate an individual sensor will form a visual indication for the crew, this visual indication being located at selected lamps 43, 44, 45 and 46 and sound bell 49. The particular sensor zone is identified by the illumination of selected lamps, the lamps being protected from illuminating erroneously by blocking diodes 51 and 66.

In the event that a pilot observes lamp 43 and 44 being illuminated, this is a clear indication that sensors located in the cabin or nose part of the uselage have detected an alarm condition. If desired, the pilot can then push the cabin valve switch 71 and later switch 70. A nose container (and another bottle) of extinguishant is then discharged into the zone in question.

Consider the possibility that an alarm lamp indicates that a sensor in the aft part of the fuselage has determined that there is a dangerous fire condition in that area. This will be indicated by the lamps 45 or 46. The aft fuselage discharge switch 74 can be actuated after closing, actuating aft fuselage valve switch 73. When switch 74 is actuated, it provides power for the container selector switch 88 shown in FIG. 1*a*, which when provided with power, selects one of the two containers (bottles) illustrated in this embodiment. The container selector switch 88 provides power for the conductor 89 (presuming the switch is in the illustrated position of FIG. 1*a*). When power is delivered over the conductor 89, it is routed through pin 7 of the connector 68 and discharges extinguishant from the bottle #1 into the valve manifold 24. From the valve manifold 24, the extinguishant must then be delivered through one of the multiple solenoid valves connected to the manifold (in this example valve 25*b*). Again, the number of manifold valves (and dischargable bottles) can be varied.

In the example of an aft located fire, it will be recalled that the switch 74 was actuated to discharge the extinguishant into the manifold. Since the alarm condition is indicated to be in the aft part of the fuselage and since the switch 73 has been actuated, at this juncture the route of extinguishant flows from the first container, the manifold 24, the selected or energized solenoid valve 25*b* and out through the nozzles. The nozzles are deployed in the area where an alarm condition is indicated to exist. Assuming the fire condition persists, selector switch 88 may be moved to its second position so that conductor 91 will be energized. Then switch 74 is actuated a second time, thus discharging bottle #2 in the manner described, its agent also flowing into the zone of interest through the manifold and valve 25*b*.

Various test routines enable the pilot to proceed through a checkout procedure before takeoff. Without repeating all of the procedures, it is noted that the deployed sensors 52 and 61 can be tested, the test also checking integrity of their associated conductors. The test apparatus also provides current flow through the electrical actuators 84, 90 and 92 of extinguishant containers.

Another test of interest is to determine the open or closed condition of the valves 25. They can be tested by momentarily applying power to the solenoid coils and observing their movement. Their movement is not visually observed at their locale or point of installation; rather, it is confirmed by the position switches 97 and 102, which illuminate lamps 104, 105 and 111, 112 at the test equipment panel to show that the valves moved to the open condition. Similarly, position switches 77 and 118 confirm that their respective valves are closed whenever switch 75 is actuated by illuminating lamps 78, 89 and 120, 121. The lack of appropriate lamp illumination confirms and localizes a malfunction of the system's equipment.

Switch 75, when used to test the extinguisher system, not only confirms that the system's valves 25*a* and 25*b* are closed, but also determines the operational status of the systems's containers. Each of the containers (bottles) has its own LED (82, 93 and 94) which will be illuminated only if the container is usable.

Another possible circuit modification would be to add another discharge switch on the control panel. This switch would discharge an associated container(s) without regard to zone valves in that the containers would discharge upon actuation directly to the fire zone without use of either of the zone valves 25*a* or 25*b* or the manifold 24. In this manner, the bottle is discharged via a pre-energized system to its protected zone. Accordingly, the control panel could combine all switches with their various functions at one, easy to operate location. Such an optional feature would permit direct application of the extinguishant to the nose (for example) without wasting the contents of another bottle normally discharged simultaneously with the specific bottle. Thus, a specific area within a generalized zone may be protected once the operator has been alerted by the appropriate sensor.

From the foregoing, it will be seen that this invention is one well adapted to attain all ends and objects hereinabove set forth together wit the other advantages which are obvious and which are inherent to the structure.

It will be understood that certain features and subcombinations are of utility and may be employed without reference to other features and subcombinations.

As many possible emboidments may be made of the invention without departing from the scope thereof, it is to be understood that all matter herein set forth or shown in the accompanying drawings is to be interpreted as illustrative and not in a limiting sense.

I claim:

1. In an aircraft fire protection system having means for applying extinguishant to selected fire zones of the aircraft, the improvement comprising:

a fire responsive sensor in each fire zone having a first condition when a fire condition is sensed and a second condition when a fire condition is not sensed;

an electric circuit for each sensor, each circuit being completed when the corresponding sensor is in the first condition and interrupted when the corresponding sensor is in the second condition;

indicator means for indicating which of the circuits are completed to provide an indication of which fire zones are exposed to fire conditions; and test means for selectively testing each circuit with the extinguishant applying means remaining operative to apply extinguishant to each fire zone, said test means being operable with each sensor in the second condition thereof to test the ability of each circuit to effect completion thereof when the corresponding sensor is subsequently disposed in the first condition thereof.

2. The improvement set forth in claim 1, wherein:

each sensor is incorporated in the corresponding circuit in a manner to complete the circuit in the first condition of the sensor and interrupt the circuit in the second condition of the sensor;

said indicator means includes a plurality of indicator elements incorporated in the respective circuits to energize upon completion of the associated circuit; and said test means includes means providing a current path bypassing each sensor to effect completion of the corresponding circuit when the sensor is in the second condition, thereby energizing the corresponding indicator element.

3. The improvement set forth in claim 2, including a normally open test switch in each current path operable when closed to effect closing of the current path.

4. A fire protection system for vehicles such as aircraft presenting therein a plurality of fire zones, said system comprising:

a closed container adopted to hold extinguishant;

a plurality of extinguishant lines each having one end disposed to receive extinguishant from the container when the latter is opened and an opposite end communicating with a selected fire zone to apply extinguishant thereto;

a valve in each line having an open position permitting flow of extinguishant through the line and a closed position blocking flow through the line;

control means for selectively opening and closing each valve to open and close selected extinguishant lines;

means for effecting opening of said container to permit extinguishant to flow into the extinguishant lines for passage to selected fire zones under the control of said control means; and means for testing each valve in a test mode of operation to confirm opening of the valve while the container remains closed to prevent flow of extinguishant into said lines in the test mode of operation.

5. The system set forth in claim 4, wherein:

each valve is a solenoid operated valve having a solenoid operable when energized to effect opening of the valve and when deenergized to effect closing of the valve;

said control means is operable to selectively energize and deenergize the solenoids; and said testing means includes an indicator circuit for each valve which is completed upon energization of the corresponding solenoid and interrupted upon deenergization of the corresponding solenoid, each indicator circuit including an indicator element which is energized upon completion of the indicator circuit to indicate opening of the corresponding valve.

6. The system set forth in claim 5, wherein said testing means includes a second indicator circuit for each valve which is completed upon deenergization of the corresponding solenoid and interrupted upon energization of the corresponding solenoid, each of said second indicator circuits including an indicator element which is energized upon completion of the corresponding second indicator circuit to indicate closing of the corresponding valve.

7. The system set forth in claim 4, wherein said control means includes:

a switch for each valve having an activated condition wherein the corresponding valve is open and a deactivated condition wherein the corresponding valve is closed; and means operable when a selected switch is activated to automatically deactivate all other switches.

8. A fire protection system as set forth in claim 7, wherein said means for effecting opening of said container includes:

electric actuator means for opening the container in response to application of current to said actuator means at a predetermined level;

an electric circuit incorporating said actuator means therein; and a switch operable when closed to complete said circuit to effect application of current to said actuator means at said predetermined level, thereby opening said container.

9. A fire protection system as set forth in claim 8, including:

a test circuit incorporating said actuator means therein, said test circuit when completed applying current to said actuator means at a level sufficiently below said predetermined level to prevent opening of the container;

a test switch operable when closed to complete said test circuit; and means for indicating completion of said test circuit to verify application of current to said actuator means.

* * * * *